H. J. COHRS.
TIRE PROTECTOR.
APPLICATION FILED APR. 26, 1922.
1,429,212. Patented Sept. 12, 1922.
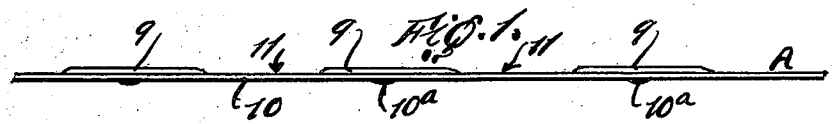
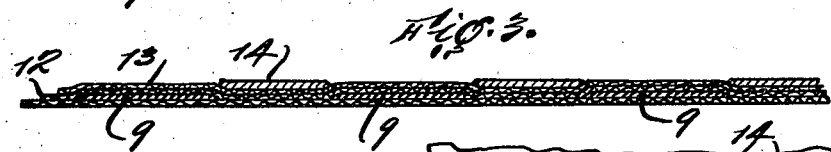
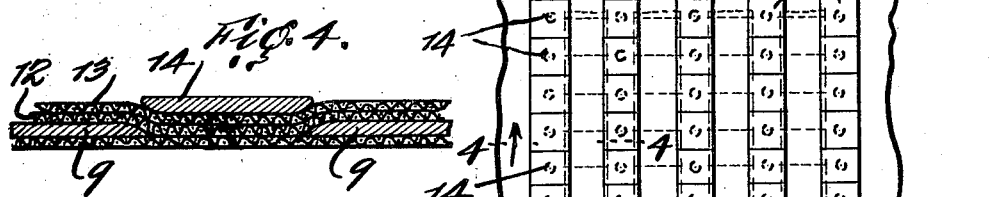
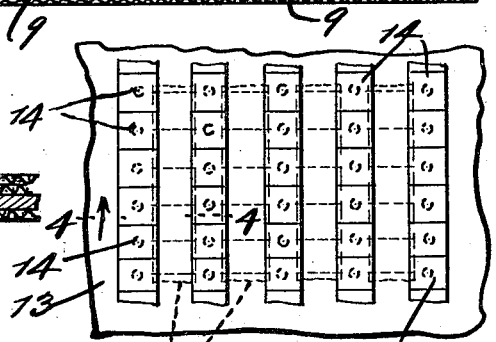
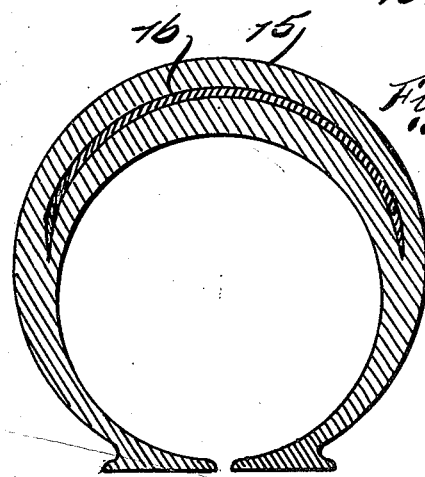
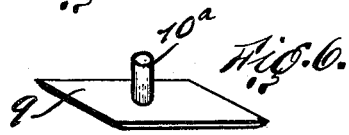
Henry J. Cohrs INVENTOR
BY [signature]
ATTORNEY Patented Sept. 12, 1922.

1,429,212

UNITED STATES PATENT OFFICE.

HENRY J. COHRS, OF JAMAICA, NEW YORK.

TIRE PROTECTOR.

Application filed April 26, 1922. Serial No. 556,756.

*To all whom it may concern:*

Be it known that I, HENRY J. COHRS, a resident of Jamaica, Queens County, State of New York, and a citizen of the United States of America, have invented certain new and useful Improvements in Tire Protectors, of which the following is a specification.

This invention relates to improvements in protecting devices for tires or tubes. My improved tire protector can be built into the wall of a tire casing or made in the form of an inner liner which can be located between the inner surface of the wall of a tire casing and a tube. One of the objects of my invention is to provide a flexible or pliable puncture-proof protector employing hard plates, such as fibre or metal plates. The protector is made up of a series of superimposed layers of fabric carrying alternately disposed plates which are maintained out of contact to avoid heating by friction. My improved protector is constructed to permit a high degree of flexibility, so as not to impair the yieldability of a pneumatic tire in connection with which my improved protector is used, as the plates which form part of the protector are separated circumferentially of the tire, sufficiently to prevent any contact between the plates, should the tire become deflated partly or even during rotation of the tire when fully inflated, at which time the tire will slightly flatten at the point of contact of the tire and ground or when the tire strikes an obstruction.

I will now proceed to describe my invention in detail, the novel features of which I will point out in the appended claim, reference being had to the accompanying drawing, wherein:—

Fig. 1 illustrates an edge view of the first lamination of my improved protector;

Fig. 2 illustrates a sectional view of the first and second laminations assembled;

Fig. 3 illustrates a sectional view of the first, second and third laminations, or complete protector, assembled;

Fig. 4 is a fragmentary sectional view, enlarged, of my improved protector, the section being taken on a line 4—4 in Fig. 5;

Fig. 5 is a fragmentary top plan view of the protector;

Fig. 6 is a detail perspective view of a form of plate which I may use;

Fig. 7 is a sectional view illustrating my improved protector built into a tire casing; and Fig. 8 is a fragmentary view illustrating a partly deflated tire.

To permit flexibility to a high degree without generating heat, I provide a plurality of plates 9 made of any suitable puncture-proof material, such as fibre or metal, of any kind. The plates will be preferably shaped as indicated in Fig. 6, and will carry a teat or projection 10$^a$ which can be used as a rivet. The plates 9 are riveted to a layer of fabric 10, as indicated in Fig. 1, and spaced one from the other, each space 11 being approximately equal to the length of the plates 9. After forming the lamination A, I secure to the same a layer 12 of fabric, as indicated in Fig. 2. The layer 12 will be vulcanized to layer 10 and to plates 9. To apply layer 12 to layer 10 and plates 9, I employ means in the form of a mangle to press layer 12 into spaces 11. The third or final lamination of the protector, is made up of a layer of fabric 13 (Fig. 3), carrying plates 14 similar to plates 9, which are riveted to layer 13. This final layer is vulcanized to layer 12, and the plates 14 will be positioned between plates 9, but in a higher plane. The plates 9 and 14 will be maintained out of contact by the interposed layers of fabric 12 and 13. As the component parts of the protector will be vulcanized together, heat will not be generated by rubbing parts. The plates 9 and 14 will be sufficiently separated to prevent rigidity, and in spite of the fact that the protector is made up largely of rigid plates, the protector possesses flexibility to a high degree owing to the disposition of the plates relatively to each other. During the action of rotation, the plates will not spread enough to permit of the passage therebetween of nails or the like.

The protector may be built into a tire casing 15, as indicated by 16, or it may be made in the form of an inner-liner.

What I desire to secure by Letters Patent is:—

In a tire protector adapted to be embedded in a tire, a layer of fabric, plates carried thereby, spaced one from the other, a second layer of fabric applied to the first layer and over said plates, said second layer being forced into the spaces between the plates on the first layer and vulcanized thereto, a third layer of fabric vulcanized to the second layer, said third layer being forced into the forced in portions of the second layer, and plates located in the forced in portion of the third layer.

HENRY J. COHRS.